United States Patent
Chalk et al.

(10) Patent No.: US 12,031,684 B2
(45) Date of Patent: Jul. 9, 2024

(54) SYSTEM AND METHOD FOR GASEOUS HYDROGEN RECOVERY IN A HYDROGEN FUELING STATION

(71) Applicant: Air Products and Chemicals, Inc., Allentown, PA (US)

(72) Inventors: David Jonathan Chalk, Slatington, PA (US); Joseph P. Cohen, Bethlehem, PA (US); David John Farese, Riegelsville, PA (US); Benjamin H. S. Torda, Allentown, PA (US)

(73) Assignee: Air Products and Chemicals, Inc., Allentown, PA (US)

(*) Notice: Subject to any disclaimer, the term of this patent is extended or adjusted under 35 U.S.C. 154(b) by 396 days.

(21) Appl. No.: 17/492,816

(22) Filed: Oct. 4, 2021

(65) Prior Publication Data
US 2023/0107342 A1  Apr. 6, 2023

(51) Int. Cl.
*F17C 5/06* (2006.01)

(52) U.S. Cl.
CPC .......... *F17C 5/06* (2013.01); *F17C 2221/012* (2013.01); *F17C 2223/0123* (2013.01); *F17C 2225/0123* (2013.01); *F17C 2250/0447* (2013.01); *F17C 2260/037* (2013.01); *F17C 2265/065* (2013.01); *F17C 2270/0139* (2013.01)

(58) Field of Classification Search
CPC .................. F17C 5/06; F17C 2221/012; F17C 2223/0123; F17C 2225/0123; F17C 2265/065; F17C 2270/0139
See application file for complete search history.

(56) References Cited

U.S. PATENT DOCUMENTS

| | | |
|---|---|---|
| 6,168,705 B1 | 1/2001 | Molter et al. |
| 2004/0163731 A1 | 8/2004 | Eichelberger et al. |
| 2015/0001091 A1* | 1/2015 | Blanchet .................. C01B 3/50 |
| | | 205/637 |
| 2021/0270522 A1* | 9/2021 | Molter .................. F25J 1/0221 |

OTHER PUBLICATIONS

European Search Report; dated Feb. 6, 2023; corresponding EP Application No. 22198165.7, 8 pgs.

* cited by examiner

*Primary Examiner* — Elizabeth J Martin
(74) *Attorney, Agent, or Firm* — Matthew R. Weaver

(57) ABSTRACT

An integrated hydrogen fueling station for fueling of vehicle tanks with hydrogen comprising an electrochemical compressor in which secondary hydrogen originating from leakage, boiling-off or venting of hydrogen-containing gas in one or more mechanical hydrogen compressors is collected and transferred to the electrochemical compressor and compressed by the electrochemical compressor, wherein the secondary hydrogen contains hydrogen and further gaseous components. A method for operating a hydrogen fueling station for fueling of vehicle tanks with hydrogen wherein secondary hydrogen originating from leakage, boiling-off or venting of hydrogen-containing gas in one or more mechanical hydrogen compressors of the fueling station operative units is collected and transferred to an electrochemical compressor and compressed in the electrochemical compressor, and wherein the secondary hydrogen contains hydrogen and further gaseous components.

17 Claims, 2 Drawing Sheets

SYSTEM AND METHOD FOR GASEOUS HYDROGEN RECOVERY IN A HYDROGEN FUELING STATION

FIELD OF THE INVENTION

The present invention relates to an integrated hydrogen fueling station for fueling of vehicle tanks with hydrogen in which secondary hydrogen originating from leakage, boiling-off or venting of hydrogen-containing gas in one or more of the fueling station operative units is recovered and to a process for operating such a hydrogen fueling station.

BACKGROUND OF THE INVENTION

Several configurations and systems for fueling of hydrogen-driven vehicles in hydrogen fueling stations are known in the art. For example, US 2004/163731 (A1) discloses a self-contained mobile gas fueling station. In such hydrogen fueling stations, hydrogen is stored and further handled in compressed or liquid form before it is dispensed to vehicle tanks in a gaseous state at high pressure. During several of these operations hydrogen may leak, is boiled-off and/or is vented, which means that this part of the hydrogen is "lost" for vehicle fueling. This leaked, boiled-off and/or vented hydrogen which, as explained below, usually contains further components is herein also denoted as "secondary hydrogen".

For example, hydrogen fueling stations typically comprise one or more mechanical hydrogen compressors. Such mechanical compressors have an inherent hydrogen leak rate during operation. The leaked hydrogen originates from multiple sources including the blowby, vapor return, and/or outlet of the compressor. Conventional mechanical hydrogen compressors lose between 1% to 5% of hydrogen to leaks, which is, of course, undesirable and represents an economic loss. To date, the emphasis is on reducing such leaks e.g by the use of oil seals within the compressor, however, this often leads to contaminants in the compressed gas stream. Furthermore, due to safety reasons the parts of the mechanical compressors wherefrom or into which hydrogen is leaking, such as the packing case and/or crankcase, have to be purged with an inert gas, usually nitrogen, which mixes with the hydrogen thereby diluting it.

The leaked, boiled-off and/or vented hydrogen usually has a reduced pressure and, due to the mixing with inert gas and/or air contains further gaseous components such as nitrogen which necessitates a separation of the hydrogen contained in said secondary hydrogen. Removing those further components adds complexity and furthermore complicates re-use of the hydrogen contained in the secondary hydrogen.

It is therefore the object of the present invention to improve and further integrate a hydrogen fueling station and its method for operation by recovering and reusing at least part of the secondary hydrogen originating from leakage, boiling-off or venting in one or more of the operating units of said hydrogen fueling station.

SUMMARY

The invention is based on the finding that this object can be achieved if the secondary hydrogen originating from leakage, boiling-off or venting in one or more of the operating units of a hydrogen fueling station is collected and compressed in an electrochemical compressor.

The present invention therefore provides in a first embodiment an integrated hydrogen fueling station for fueling of vehicle tanks with hydrogen characterized in that it comprises an electrochemical compressing unit in which secondary hydrogen originating from leakage, boiling-off or venting of hydrogen-containing gas in one or more of the fueling station operative units is compressed, wherein the secondary hydrogen contains hydrogen and further gaseous components.

In embodiments, the hydrogen fueling station comprises one or more mechanical hydrogen compressing units producing secondary hydrogen which is collected and transferred to the electrochemical compressing unit.

In embodiments, the hydrogen fueling station comprises one or more hydrogen dispensing units producing secondary hydrogen which is collected and transferred to the electrochemical compressing unit.

In embodiments, the hydrogen fueling station comprises one or more hydrogen transport lines producing secondary hydrogen which is collected and transferred to the electrochemical compressing unit.

In embodiments, the secondary hydrogen contains hydrogen in an amount of from 1% to 99% by mass, preferably in an amount of from 5% to 95% by mass, even more preferably in an amount of from 25% to 90% by mass.

In embodiments, nitrogen makes up 50% by mass or more of the further gaseous components contained in the secondary hydrogen.

In embodiments, the impurity level of hydrogen in the pressurized hydrogen obtained after compression in the electrochemical compressing unit is 1,000 ppm or lower, more preferably is 500 ppm or lower, and most preferably is 300 ppm or lower.

In embodiments, the hydrogen fueling station comprises a secondary hydrogen collecting system which collects the secondary hydrogen produced by one or more of the hydrogen fueling station operation units and which is connected to the electrochemical compressing unit.

In embodiments, the secondary hydrogen collecting system comprises a secondary hydrogen buffer tank.

In embodiments, the compressed hydrogen obtained from the electrochemical compressing unit is transferred to an intermediate hydrogen storage volume or is combined with high-pressure primary hydrogen.

In a second embodiment, the present invention provides a method for operating a hydrogen fueling station for fueling of vehicle tanks with hydrogen characterized in that secondary hydrogen originating from leakage, boiling-off or venting of hydrogen-containing gas in one or more of the fueling station operative units is compressed in an electrochemical compressing unit, wherein the secondary hydrogen contains hydrogen and further gaseous components.

The invention allows for a very effective recovering and re-use of otherwise lost, secondary hydrogen in a hydrogen fueling station which comprises leaked, vented or boiled-off hydrogen in a mixture with further gaseous components, and hence for a better integration of such a station, thus providing an economic benefit.

Electrochemical compressors, which are also denoted as electrochemical membrane pumps, utilise an electric field across a membrane-electrode-assembly to dissociate hydrogen into protons, then carry these protons across said membrane-electrode-assembly, and finally convert them to hydrogen gas at the cathode. For example, such a process has been described to selectively accumulate hydrogen gas across the device in U.S. Pat. No. 6,168,705. Electrochemical compressors have no moving parts and a compact size.

Hydrogen with a pressure of 100 MPa may be obtained through electrochemical compression.

The use of an electrochemical compressing unit for compressing the secondary hydrogen in the present invention provides the advantage that in the same step/same device wherein the hydrogen to be re-used is compressed also the further components contained in the secondary hydrogen, such as nitrogen gas, are separated from it, i.e. the hydrogen is purified simultaneously to its compression. Accordingly, hydrogen which can directly be re-used for fueling of vehicles is obtained from said secondary hydrogen in purified and pressurized state in only one step by use of said electrochemical compressing unit.

Moreover, electrochemical compressors can operate at variable flow rates at variable inlet and outlet pressures, and at variable concentration of hydrogen in the feed gas which makes them especially well suited for compression of said secondary hydrogen which is generated in varying amounts, pressures and flow rates, and with varying hydrogen concentration during operation of the various units of the fueling station. Due to their compact size and the lack of moving parts, electrochemical compressors are simple systems with low maintenance costs.

Of course, integration of an electrochemical compressing unit adds to the investment costs of a hydrogen fueling station, however, the advantage to re-cycle otherwise lost, secondary hydrogen compensates for and outweighs these higher costs.

BRIEF DESCRIPTION OF THE DRAWING

The present invention will hereinafter be described in conjunction with FIG. 1 wherein like numerals denote like elements.

DETAILED DESCRIPTION

Figure 1:
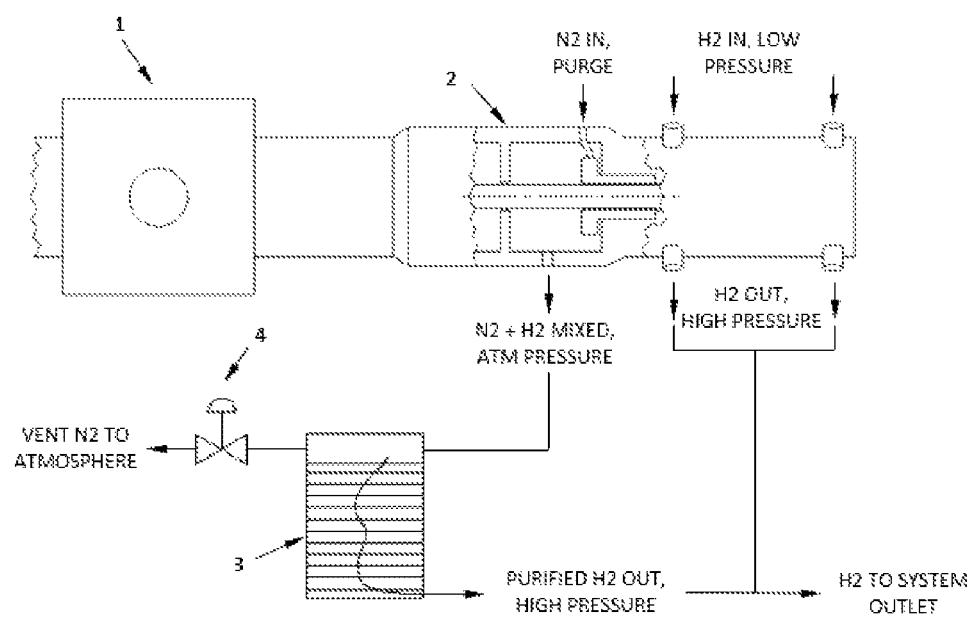
FIGS. 1 and 2 show part of embodiments of the integrated fueling station and the method of the invention.
Figure 2:
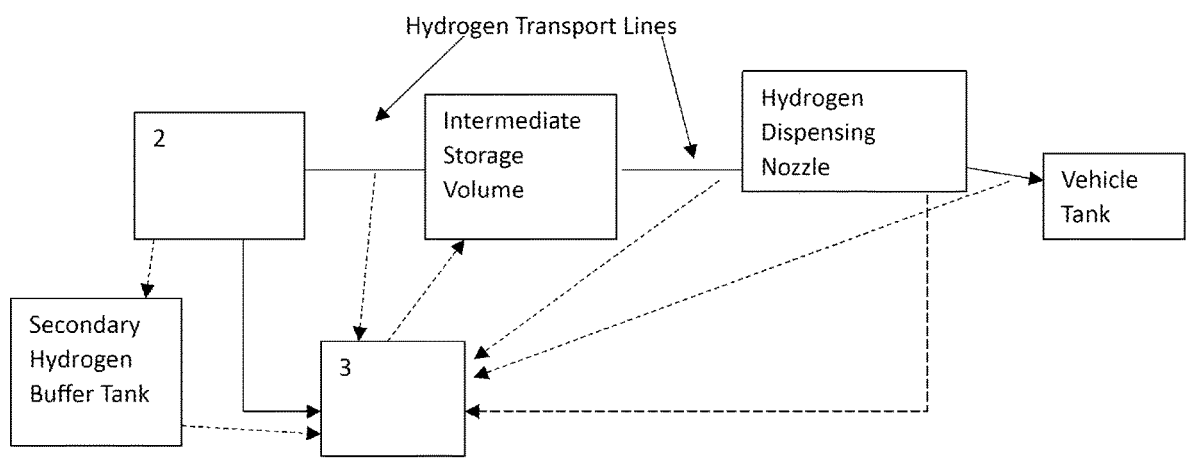

Preferably, the hydrogen fueling station comprises one or more mechanical hydrogen compressing units producing secondary hydrogen which is collected and transferred to the electrochemical compressing unit.

Mechanical compressors are usually used for compressing gaseous hydrogen to the pressure needed for filling of vehicle tanks, which preferably is done up to a pressure of 30 MPa or more. For example, hydrogen is pressured up to 40 MPa or more for H35 fueling, or 90 MPa or more for H70 fueling. Such mechanical compressors have an inherent hydrogen leak rate during operation due to leakage of hydrogen from multiple points including the blowby, vapor return, and/or outlet of the compressor, e.g. via piston rings or the shaft seal. Conventional mechanical hydrogen compressors lose between 1% to 5% of hydrogen to leaks.

The compressed hydrogen obtained by mechanical compression is then usually transferred to an intermediate hydrogen storage volume, such as a hydrogen storage bank. Fueling of vehicle tanks may then be done by cascading hydrogen from different storage tanks of the bank to the hydrogen dispensing unit and ultimately to the vehicle tank. Cascading is well known to the skilled person and is described, for example, in U.S. Pat. No. 8,899,278, starting in col. 1, line 17.

The leaked secondary hydrogen from the one or more, or all, mechanical compressors of the hydrogen fueling station is collected and transferred to the electrochemical compressing unit for compression.

As the parts of the mechanical compressors wherefrom or into which hydrogen is leaking, such as the packing case and/or crankcase, have to be purged with an inert gas, usually nitrogen, due to safety reasons, the secondary hydrogen collected from mechanical compressors usually comprises significant amounts of such inert gas, such as nitrogen.

Preferably, the hydrogen fueling station comprises one or more hydrogen dispensing units producing secondary hydrogen which is collected and transferred to the electrochemical compressing unit.

The dispensing units each comprise a nozzle through which the compressed hydrogen is passed to the vehicle tank. During operation, a volume of gaseous hydrogen is left in dispending system and dispensing line after dispensing. This remaining hydrogen is usually vented. The vented secondary hydrogen from the one or more, or all, hydrogen dispensing units of the hydrogen fueling station is collected and transferred to the electrochemical compressing unit for compression.

Preferably, the hydrogen fueling station comprises one or more hydrogen transport lines producing secondary hydrogen which is collected and transferred to the electrochemical compressing unit.

During transport of hydrogen in hydrogen transport lines, hydrogen may leak, and, where liquid hydrogen is transported, these lines have to be cooled where upon hydrogen boil-off gas is formed which is usually vented. The leaked and/or vented secondary hydrogen from the one or more, or all, hydrogen transport lines of the hydrogen fueling station is collected and transferred to the electrochemical compressing unit for compression.

The secondary hydrogen which is collected and transferred to the electrochemical compressing unit for compression may contain hydrogen in an amount of 1% by mass or more, 2% by mass or more, 5% by mass or more, 10% by mass or more, 25% by mass or more, or even 40% by mass or more.

The secondary hydrogen which is collected and transferred to the electrochemical compressing unit for compression may contain hydrogen in an amount of up to 99% by mass, up to 95% by mass, up to 90% by mass, up to 80% by mass, or up to 65% by mass.

The remainder of the secondary hydrogen, i.e. the components other than hydrogen, are other gaseous components which may comprise, or consist of, nitrogen, carbon dioxide and/or oxygen. Usually, the main part, or even all, of the other gaseous components is made up by nitrogen. For example, if the total amount of other gaseous components is 100% by mass, nitrogen may make up 50% by mass or more, 75% by mass or more, 90% by mass or more or even 95% by mass or more of said other gaseous components.

The flow rate of secondary hydrogen transferred to the electrochemical compression unit may be from 20 to 2000 SCFH (0.57 to 56.6 $Sm^3/h$), such as from 30 to 1500 SCFH (0.85 to 42.5 $Sm^3/h$), or 40 to 1000 SCFH (1.1 to 28.3 $Sm^3/h$), or 50 to 750 SCFH (1.4 to 21.2 $Sm^3/h$). The flow rate of the secondary hydrogen to the electrochemical compression unit may vary during operation of said unit, preferably within the limits of one of the above mentioned ranges.

Preferably, the hydrogen fueling station comprises a secondary hydrogen collecting system which collects the secondary hydrogen produced by one or more, or all, of the hydrogen fueling station's operation units and which is connected to the electrochemical compressing unit.

The secondary hydrogen which is collected by the secondary hydrogen collecting system is then transferred to the electrochemical compressing unit.

The secondary hydrogen collecting system may comprise a secondary hydrogen buffer tank. In said secondary hydrogen buffer tank secondary hydrogen is collected from one or more, preferably from all of the secondary hydrogen sources from which secondary hydrogen is collected by the collection system, and stored before it is transferred to the electrochemical compressing unit. The outlet of the secondary hydrogen buffer tank is usually directly connected to the inlet of the electrochemical compressing unit. Outlet and inlet of the secondary hydrogen buffer tank are usually equipped with valves so that the incoming and outgoing flow of secondary hydrogen can be controlled, e.g. be cut off. Use of the secondary hydrogen buffer tank allows i.a. for a better control of the secondary hydrogen's flow to the electrochemical compressing unit.

However, due to the fact that the electrochemical compression unit can vary the compression rate of the feed gas mixture, the fueling station of the invention may also be operated without a secondary hydrogen buffer tank, i.e. such a buffer tank may not be present in the station of the invention, so that secondary hydrogen collected from any one or the above mentioned units of the fueling station is directly transferred to the inlet of the electrochemical compression unit and compressed at a flow rate which varies to match the incoming gas stream.

Alternatively, for the same reason the fueling station of the invention may also be operated with a secondary hydrogen buffer tank which has a comparatively small volume.

In the secondary hydrogen collecting system and/or the secondary hydrogen buffer tank the secondary hydrogen may be at ambient pressure, or may be at a pressure above ambient pressure. Preferably, the secondary hydrogen collected in the secondary hydrogen collecting system and/or the secondary hydrogen buffer tank is at a pressure of 0.1 to 4 MPa.

For example, the secondary hydrogen buffer tank may be a gas bag containing the secondary hydrogen, or may also be a rigid vessel containing the secondary hydrogen.

The secondary hydrogen buffer tank, if present, may be equipped with a pressure sensor which triggers opening of the outlet valve of the secondary hydrogen buffer tank and hence transfer of secondary hydrogen to the electrochemical compressing unit when a defined pressure threshold is reached. At the same pressure threshold or time when the opening of the outlet valve is triggered, closing of the inlet valve may be triggered.

During operation of the secondary hydrogen compressing unit, hydrogen will be extracted from the secondary hydrogen reservoir, such as the secondary hydrogen collecting system and/or the secondary hydrogen buffer tank, connected to the inlet of the electrochemical compressing unit. Thus, non-hydrogen components of the secondary hydrogen, such as nitrogen, will accumulate at the inlet side of the electrochemical compressing unit.

Therefore, preferably, the inlet side of the electrochemical compressing unit comprises a venting device such as a vent valve to allow for purging of gas. Purging may be effected, for example, where the hydrogen content of the secondary hydrogen at the inlet side of the electrochemical compressing unit becomes too low to allow for an efficient compression in the electrochemical compression unit.

The inlet side of the electrochemical compressing unit may be equipped with a sensor that detects the concentration of hydrogen at the inlet side of the electrochemical compressing unit which triggers opening of the venting device and hence purging of gas contained therein when a defined concentration threshold is reached.

For example, purging of gas from the secondary hydrogen buffer tank may be effected when the hydrogen concentration in the tank reaches a threshold of 1% by mass, or 5% by mass.

Alternatively or additionally, the secondary hydrogen collecting system, preferably the secondary hydrogen buffer tank, may be equipped with a flow meter for example at the inlet or outlet or both inlet and outlet of the tank. Where the decrease of hydrogen concentration at the inlet side of the electrochemical compressing unit is known as a function of the incoming and/or outgoing flow, the flow meter may trigger opening of the venting device and hence purging of gas contained therein when a defined through flow has been reached.

Furthermore, alternatively or additionally, the opening of the venting device may also be triggered when a predetermined time has elapsed, depending on the operation of the electrochemical compressor.

Still further, alternatively or additionally, the opening of the venting device may also be triggered when a predetermined threshold of the energy consumption of the electrochemical compression unit is reached, as the power consumption of the unit is dependent on the hydrogen concentration of the inlet stream.

Purging may also be effected at regular time intervals.

After compression in the electrochemical compressing unit, purified and pressurized hydrogen is obtained.

Preferably, the impurity level of hydrogen in the pressurized hydrogen obtained after compression in the electrochemical compressing unit, i.e. the amount of components in the compressed gas different from hydrogen, is 1,000 ppm or lower, more preferably is 500 ppm or lower, and most preferably is 300 ppm or lower.

Further preferred, the pressure of hydrogen obtained after compression in the electrochemical compressing unit is 30 MPa or more.

The compressed hydrogen obtained from the electrochemical compressing unit may be combined with high-pressure primary hydrogen, i.e. pressurized hydrogen which obtained by or present in the hydrogen fueling station by regular operation, at any instance. For example, it may be transferred to and combined with pressurized primary hydrogen obtained at the outlet side of one or more mechanical compressors.

Preferably, in the hydrogen fueling station of the invention, the compressed hydrogen obtained from the electrochemical compressing unit is transferred to an intermediate hydrogen storage volume, such as the hydrogen storage bank as described herein before, in which also primary pressurized hydrogen is stored.

The hydrogen outlet stream from the intermediate hydrogen storage volume can be fed to the hydrogen dispensing system.

The present invention furthermore relates to a method for operating a hydrogen fueling station for fueling of vehicle tanks with hydrogen characterized in that secondary hydrogen originating from leakage, boiling-off or venting of hydrogen-containing gas in one or more of the fueling station's operative units is compressed in an electrochemical compressing unit wherein the secondary hydrogen contains hydrogen and further gaseous components.

Any of the embodiments described herein for the hydrogen fueling station of the invention also apply for the method of the invention.

In particular, the method for operating a hydrogen fueling station of the invention preferably comprises collecting secondary hydrogen produced by one or more mechanical hydrogen compressing units, produced by one or more hydrogen dispensing units, and/or produced by one or more hydrogen transport lines and transferring it to the electrochemical compressing unit.

In the exemplified embodiment, the fueling station of the invention comprises a mechanical compressor 1 which comprises a distance piece 2.

In use, gaseous hydrogen to be compressed enters the inlet of the mechanical compressor 1 at low pressure, is compressed therein and leaves the compressor at the desired high pressure. During operation of the compressor 1, hydrogen leaks from it, for example from the compressor packings, and the leaked hydrogen is purged by a nitrogen stream which enters the distance piece 2 through a purge opening, thus forming secondary hydrogen. The secondery hydrogen, being a mixture of nitrogen and hydrogen gas, leaves the distance piece 2 through a purge gas outlet opening at atmospheric pressure.

This secondary hydrogen is collected by a secondary hydrogen collecting system which includes, for example, a housing around the mechanical compressor 1, and is transferred to an electrochemical compression unit 3.

The secondary hydrogen is compressed and purified in the electrochemical compression unit 3 and is then e.g. transferred to be combined with the pressurized primary hydrogen of the outlet of the mechanical compressor 1, which is transferred to a hydrogen storage bank for filling of vehicle tanks via a pressurized hydrogen dispensing system.

The electrochemical compressing unit is equipped with a venting valve 4 to allow for purging of gas from the inlet section of the compressing unit, e.g. in case where the hydrogen content of the secondary hydrogen at the inlet tank becomes too low to allow for an efficient compression in the electrochemical compression unit.

The secondary hydrogen collection system may comprise a secondary hydrogen buffer tank which is equipped with a sensor (not shown) that detects the concentration of hydrogen in the tank which triggers opening of the vent valve of the secondary hydrogen buffer tank and hence purging of gas contained therein when a defined concentration threshold is reached.

What is claimed is:

1. An integrated hydrogen fueling station for fueling of vehicle tanks with hydrogen comprising an electrochemical compressor in which secondary hydrogen originating from leakage, boiling-off or venting of hydrogen-containing gas in one or more mechanical hydrogen compressors is collected and transferred to the electrochemical compressor and compressed by the electrochemical compressor, wherein the secondary hydrogen contains hydrogen and further gaseous components.

2. The hydrogen fueling station of claim 1 comprising one or more hydrogen dispensing nozzles producing secondary hydrogen which is collected and transferred to the electrochemical compressor.

3. The hydrogen fueling station of claim 1 comprising one or more hydrogen transport lines producing secondary hydrogen which is collected and transferred to the electrochemical compressor.

4. The hydrogen fueling station of claim 1 wherein the secondary hydrogen contains hydrogen in an amount of from 25% to 90% by mass.

5. The hydrogen fueling station of claim 1 wherein nitrogen makes up 50% by mass or more of the further gaseous components contained in the secondary hydrogen.

6. The hydrogen fueling station of claim 1 wherein the impurity level of hydrogen in the pressurized hydrogen obtained after compression in the electrochemical compressor is 300 ppm or lower.

7. The hydrogen fueling station of claim 1 comprising a secondary hydrogen buffer tank which collects the secondary hydrogen produced by one or more mechanical hydrogen compressors and which is connected to the electrochemical compressor.

8. The hydrogen fueling station of claim 1 wherein the compressed hydrogen obtained from the electrochemical compressor is transferred to an intermediate hydrogen storage volume or is combined with high-pressure primary hydrogen.

9. A method for operating a hydrogen fueling station for fueling of vehicle tanks with hydrogen wherein secondary hydrogen originating from leakage, boiling-off or venting of hydrogen-containing gas in one or more mechanical hydrogen compressors is collected and transferred to an electrochemical compressor and compressed in the electrochemical compressor, and wherein the secondary hydrogen contains hydrogen and further gaseous components.

10. The method of claim 9 comprising collecting secondary hydrogen produced by one or more hydrogen transport lines and transferring it to the electrochemical compressor.

11. The method of claim 9 wherein the secondary hydrogen contains hydrogen in an amount of from 25% to 90% by mass.

12. The method of claim 9 wherein nitrogen makes up 50% by mass or more of the further gaseous components contained in the secondary hydrogen.

13. The method of claim 9 wherein the impurity level of hydrogen in the pressurized hydrogen obtained after compression in the electrochemical compressor is 300 ppm or lower.

14. The method of claim 9 wherein secondary hydrogen produced by one or more of the mechanical hydrogen compressors is collected by a secondary hydrogen buffer tank and is transferred to the electrochemical compressor.

15. The method of claim 9 comprising purging of secondary hydrogen from the inlet of the electrochemical compressor.

16. The method of claim 9 wherein the compressed hydrogen obtained from the electrochemical compressor is transferred to an intermediate hydrogen storage volume or is combined with high-pressure primary hydrogen.

17. An integrated hydrogen fueling station for fueling of vehicle tanks with hydrogen comprising:
   an electrochemical compressor in which secondary hydrogen originating from leakage, boiling-off or venting of hydrogen-containing gas in one or more of a mechanical hydrogen compressor, a hydrogen dispensing nozzle or dispensing line, or a hydrogen transport line, is compressed, wherein the secondary hydrogen contains hydrogen and further gaseous components and wherein the compressed hydrogen obtained from the electrochemical compressor is transferred to an intermediate hydrogen storage volume or is combined with high-pressure primary hydrogen.

* * * * *